D. M. KNOX.
BRAKE BEAM SAFETY SUPPORT.
APPLICATION FILED JAN. 3, 1911.

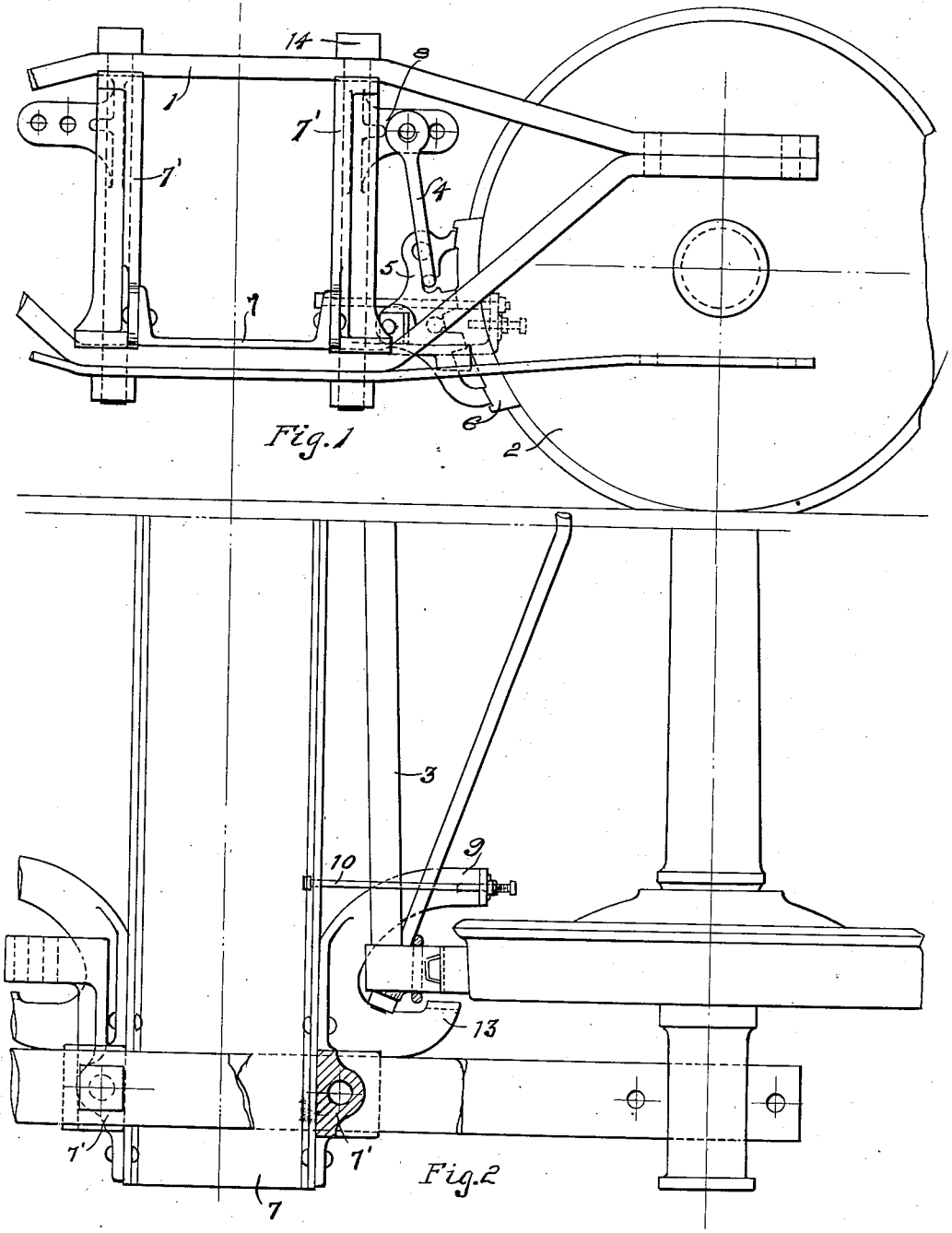

999,801.

Patented Aug. 8, 1911.
3 SHEETS—SHEET 2.

WITNESSES

INVENTOR

D. M. KNOX.
BRAKE BEAM SAFETY SUPPORT.
APPLICATION FILED JAN. 3, 1911.
999,801.
Patented Aug. 8, 1911.
3 SHEETS—SHEET 3.
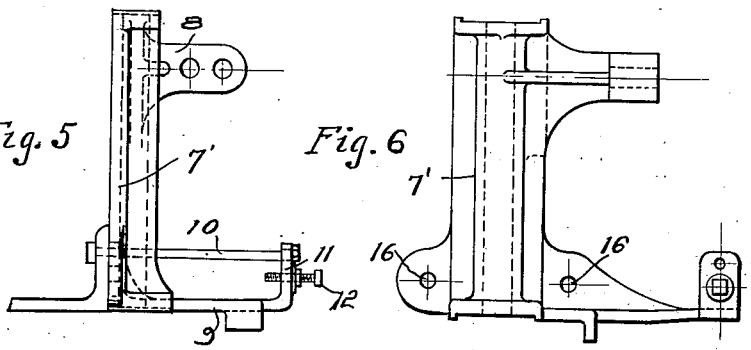
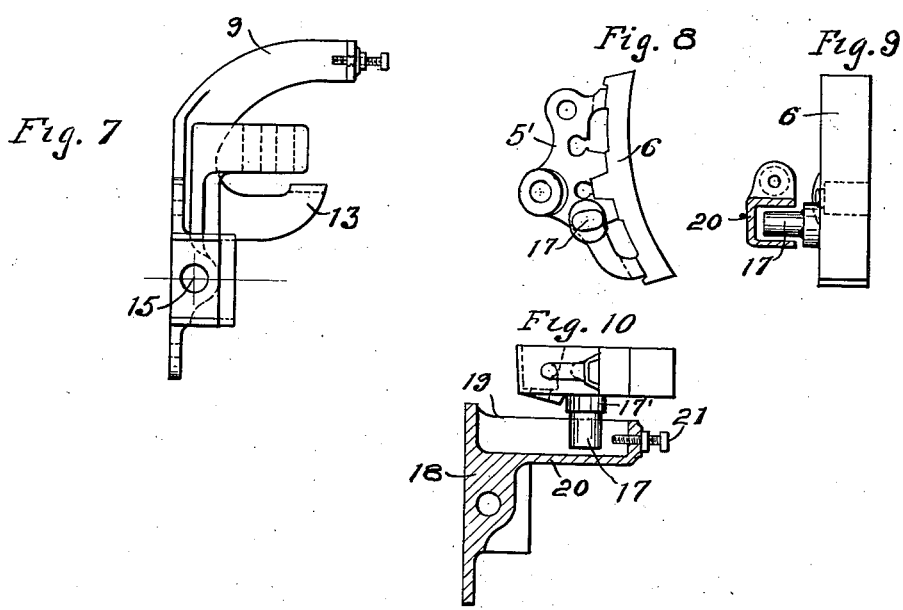
WITNESSES
INVENTOR
David M. Knox

UNITED STATES PATENT OFFICE.

DAVID M. KNOX, OF ST. LOUIS, MISSOURI, ASSIGNOR OF ONE-HALF TO WILLIAM J. KNOX, OF DUBOIS, PENNSYLVANIA.

BRAKE-BEAM SAFETY-SUPPORT.

999,801. Specification of Letters Patent. Patented Aug. 8, 1911.

Application filed January 3, 1911. Serial No. 600,647.

*To all whom it may concern:*

Be it known that I, DAVID M. KNOX, a citizen of the United States, residing at St. Louis, in the State of Missouri, have invented certain new and useful Improvements in Brake-Beam Safety-Supports, of which the following is a specification.

The invention relates to a safety means for use with brake beams and to certain other features of construction, which may conveniently be applied in connection with such safety means.

The invention has for its primary objects; the provision of improved means for supporting the brake beam in case of a failure of the hangers or other supporting means; the provision of improved means for maintaining the brake shoe in its proper lateral position so that it will at all times properly engage the periphery of the wheel; the provision of improved means for limiting the travel of the brake beam toward the wheel center in order to avoid injury to the brake head in case the shoe becomes broken or worn out; the provision of means whereby the position of the brake beam with respect to the wheel may be shifted to maintain the proper relation between the shoe and wheel after the shoe has been worn or for use with wheels of different diameters; and the provision of a combination bracket of simple construction embodying the various features of improvement as heretofore recited, and readily applicable to the ordinary type of car construction.

Certain embodiments of the invention are illustrated in the accompanying drawings, wherein:—

Figure 3:
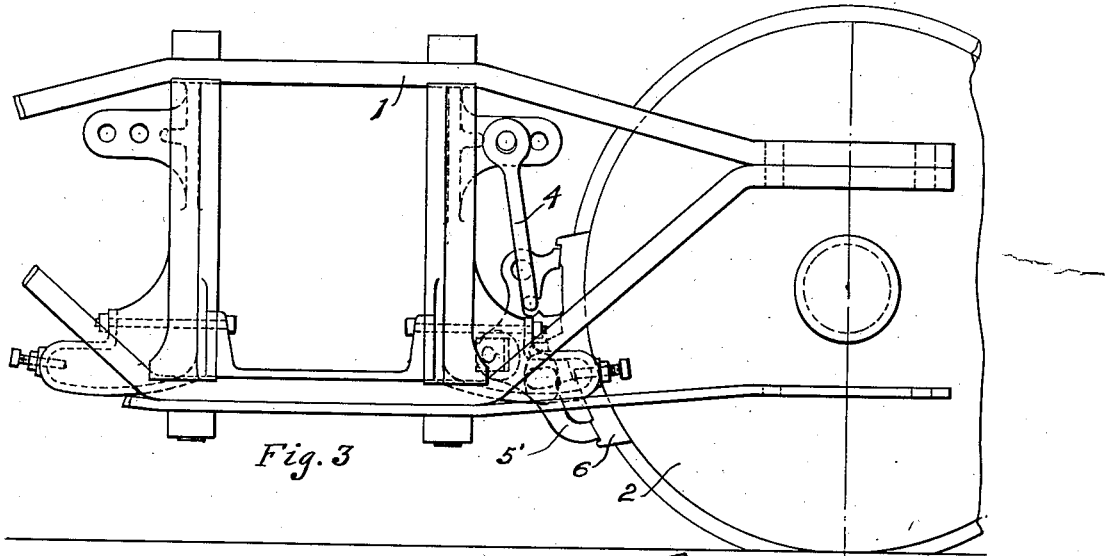
Figure 4:
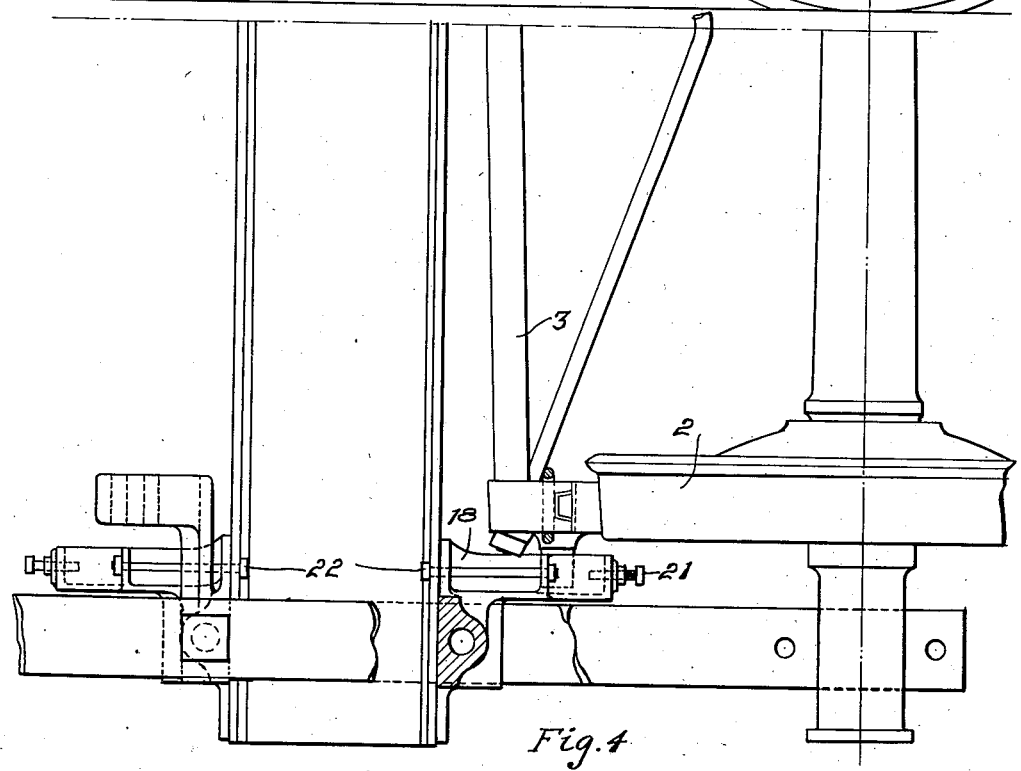

Figures 1 and 2 are partial side and plan views respectively of one form of my invention as applied to an ordinary car structure, Figs. 3 and 4 are views similar to those of Figs. 1 and 2 but showing a modified form of the invention, Figs. 5, 6 and 7 are detail views of the bracket employed in the construction of Figs. 1 and 2, and Figs. 8, 9 and 10 are detail views of the bracket and shoe construction of Figs. 3 and 4.

Referring first to the construction of Figs. 1 and 2, 1 is the truck side frame which may be of any approved form, 2 is one of the wheels carried by the truck framing, 3 is the brake beam, which as shown is of the truss type, but may be of any approved construction, 4 is one of the hangers for suspending the brake beam, 5 is one of the brake heads and 6 is one of the brake shoes.

It will be understood that the construction as thus far described is old and well known, and that my invention to be hereinafter described is not limited to use with the construction above described, but is of general application. It will also be understood that the other half of the apparatus, not shown in Fig. 2, corresponds in all particulars to the portion of construction shown.

Extending from one side of the truck frame to the other is the transverse frame member 7, and it is upon this member 7 and the side frame 1 that the columns 7' are supported in the form of construction illustrated. One of the columns 7' is shown in detail in Figs. 5, 6 and 7, and is secured to the transverse member 7 by bolts or rivets as indicated in Figs. 1 and 2. This column is provided at its upper portion with a suspension lug 8, to which is pivoted the suspension rod or hanger, the two points of support being provided in order that the upper end of the suspension rod may be adjusted toward the wheel to compensate for the wear of the shoe, and wheel, or the application of different sized wheels to the truck, and so maintain the rod and shoe always at the proper angle with respect to the wheel. The lower portion of the column is provided with the arm 9 projecting beneath the brake beam, which arm 9 may be termed the bottom guard, inasmuch as it serves to prevent the dropping of the brake beam in case of a failure of the suspension rod 4. This guard would not only prevent the brake beam from falling to the ground, but would also serve as an operative support for the beam where the direction of travel of the periphery of the wheel at the brake shoe is downward, so that even in case the hanger 4 should fail the beam and shoe could still be used for braking purposes.

In order to prevent upward movement of the brake beam in case of a failure of the hangers, the rod 10 is provided, which rod as indicated in Fig. 1, lies above the brake beam and is secured in position by means of a nut. This member may be termed the top guard and would come into play in case the hangers failed under compression, or in case there had been a failure of the hangers and the brakes were applied to the wheels while moving in a reverse direction. The end of the bottom guard 9 is turned up as indicated at 11, and this upturned end is provided with an adjustable stop bolt 12, which is adapted to take against the brake beam and limit its movement toward the wheel. This is so positioned that it will not interfere with the operation of the brake, but will prevent the brake head from coming against the wheel in case the shoe is entirely worn out or is broken off. The brake head and brake beam are thus protected against danger of injury due to the failure of the brake shoe. The bracket is also provided with a stop 13 positioned opposite the outer side of the brake head and shoe and adapted to limit the lateral movement thereof. This stop 13 acting in conjunction with the corresponding stop at the other end of the brake beam prevents lateral movement of the shoes from their proper positions upon the treads of the wheels, and obviates the danger of the shoe pressing only partly upon treads, and the danger of the shoes working inward and cutting the throats of the wheel flanges. The column is rigidly held in position by means of the bolt 14 passing vertically through the hole 15 (Fig. 7), and by the rivets extending through the holes 16 (Fig. 6). As illustrated the various safety parts and arms are made integral with the column 7', but it is obvious that it is not necessary that such parts be integral with the column and that the various parts might be secured to the column side frame and other parts of the truck in any desired way.

A modified form of construction is shown in Figs. 3, 4, 8, 9 and 10, and the truck frame and brake elements 1, 2, 3, 4 and 6 being similar to those shown in Figs. 1 and 2, but the brake head 5' and safety bracket being of a modified type. As shown in Figs. 8, 9 and 10, the brake head is provided with a laterally projecting member 17, and the bracket 18 is provided with an elongated recess 19 for receiving the member 17 as indicated in Fig. 9, the bracket recess is adapted to prevent either upward or downward movement of the brake head in case of failure of the hangers, the upper and lower walls of the recess corresponding in function to the top and bottom guards respectively of the form of construction shown in Figs. 5, 6 and 7. The endwise movement of the brake beam is limited by the shoulder 17' coming in contact with the edges of the upper and lower walls of the recess 19, and the movement of the brake shoe toward the wheel is limited by the engagement of the member 17 with the adjustable stop bolts 21.

It will be obvious that the invention might be embodied in a number of different forms of construction, and brackets corresponding to those shown be cast with or attached to truck frames made as one-piece casting in lieu of the rolled bars shown, but the two forms illustrated will be sufficient to indicate the scope of the invention.

Having thus described my invention and illustrated its use, what I claim as new and desire to secure by Letters Patent is the following:—

1. The combination with a car truck, a brake beam and means for suspending the brake beam, of a safety bracket carried by the truck side frame and positioned so as to support the brake beam in case of a failure of the means for suspending the brake beam.

2. The combination with a car truck, a brake shoe, a carrier for the brake shoe, and suspending means for the carrier, of a rigid safety support carried by the truck side frame and projecting beneath the carrier.

3. The combination with a car truck, a brake shoe, a carrier for the brake shoe, and suspending means for the carrier, of a rigid safety support carried by the truck side frame and projecting above and below the carrier so as to limit its movement in both directions in case of a failure of the suspending means.

4. The combination with a car truck, a brake beam and means for suspending the brake beam, of a safety bracket carried by the truck side frame and having portions lying both above and below the beam in position to prevent movement thereof in either direction in case of a failure of the means for suspending the brake beam.

5. The combination with a car truck, a brake beam, and means for suspending the brake beam, of a safety member projecting from the truck side frame between the wheels and beneath the brake beam and adapted to support the beam in case of a failure of the suspending means.

6. The combination with a car truck, a brake beam and means for suspending the brake beam, of a safety member projecting from the truck side frame between the wheels and beneath the brake beam, and adapted to support the beam in case of a failure of the suspending means, and a safety means lying above the beam for preventing its upward movement.

7. The combination with a car truck, a brake beam, brake shoes carried thereby and means for suspending the brake beam, of a safety bracket carried by the truck and positioned so as to support the brake beam in case of a failure of the means for suspending the brake beam, and provided with stop means for preventing the brake beam from moving laterally so that the brake shoes will not properly engage the wheel flanges.

8. The combination with a car truck, a brake beam, brake shoes carried thereby and means for suspending the brake beam, of a safety bracket carried by the truck and positioned so as to support the brake beam in case of a failure of the means for suspending the brake beam, and provided with stop means for preventing further forward movement of the shoes after the wearing portions thereof have been worn away or broken.

9. The combination with a car truck, a brake beam and means for supporting the brake beam, of a safety bracket carried by the truck, and positioned so as to support the brake beam in case of a failure of the means for suspending the brake beam, and provided with adjustable means for limiting the movement of the brake beam toward the center of the truck wheel.

10. The combination with a car truck, a brake shoe, a carrier for the brake shoe, and suspending means for the carrier, of a stop mounted on the truck for preventing further forward movement of the shoe after the wearing portions thereof have been worn away or broken.

11. The combination with a car truck, a brake shoe, a carrier for the brake shoe, and suspending means for the carrier, of an adjustable stop mounted on the truck for limiting the movement of the shoe toward the center of the truck wheel.

12. The combination with a car truck, a brake shoe, a carrier for the brake shoe, and suspending means for the carrier, of a rigid safety support carried by the truck for limiting the vertical movement of the carrier in case of a failure of the suspending means, and stop means on such support for preventing further forward movement of the shoe after the wearing portions thereof have been worn away or broken.

13. The combination with a car truck, a brake shoe, a carrier for the brake shoe, and suspending means for the carrier, of a rigid safety support carried by the truck for limiting the vertical movement of the carrier in case of a failure of the suspending means, stop means on such support for limiting the movement of the carrier toward the center of the wheel, and other stop means on such support for limiting the endwise movement of the carrier.

In testimony whereof I have hereunto signed my name in the presence of the two subscribed witnesses.

DAVID M. KNOX.

Witnesses:
HARVEY L. LECHNER,
DOERING BELLINGER.